US 7,339,883 B2

(12) United States Patent
Santhoff et al.

(10) Patent No.: US 7,339,883 B2
(45) Date of Patent: Mar. 4, 2008

(54) ULTRA-WIDEBAND COMMUNICATION PROTOCOL

(75) Inventors: John Santhoff, San Diego, CA (US); Kazimierz Siwiak, Coral Springs, FL (US)

(73) Assignee: Pulse-LINK, Inc., Carlsbad, CA (US)

( * ) Notice: Subject to any disclaimer, the term of this patent is extended or adjusted under 35 U.S.C. 154(b) by 40 days.

(21) Appl. No.: 10/663,174

(22) Filed: Sep. 15, 2003

(65) Prior Publication Data

US 2005/0058121 A1 Mar. 17, 2005

(51) Int. Cl.
*H04J 11/00* (2006.01)
*H04Q 7/00* (2006.01)
*H04B 7/216* (2006.01)

(52) U.S. Cl. ............... 370/203; 370/328; 370/335; 370/342

(58) Field of Classification Search ........ 370/203–208, 370/335, 338, 342; 455/84
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 4,641,317 A | 2/1987 | Fullerton | |
| 4,979,186 A | 12/1990 | Fullerton | |
| 5,146,616 A | 9/1992 | Tang et al. | |
| 5,363,108 A | 11/1994 | Fullerton | |
| 5,677,927 A | 10/1997 | Fullerton et al. | |
| 5,687,169 A | 11/1997 | Fullerton | |
| 5,748,891 A | 5/1998 | Fleming et al. | |
| 5,920,278 A | 7/1999 | Tyler et al. | |
| 6,002,708 A | 12/1999 | Fleming et al. | |
| 6,026,125 A | 2/2000 | Larrick, Jr. et al. | |
| 6,031,862 A | 2/2000 | Fullerton et al. | |
| 6,178,217 B1 | 1/2001 | Defries et al. | |

(Continued)

FOREIGN PATENT DOCUMENTS

WO WO 01/39451 A1 5/2001

(Continued)

OTHER PUBLICATIONS

DI Wu, Predrag Spasojevic, Ivan Seskar, "Multipath Beamforming UWB Signal Design Based on Ternary Sequences", 40th Annual Allerton Conference, Aug. 26, 2002, Winlab, Rutgers University, Camden, New Jersey, USA.

(Continued)

*Primary Examiner*—Melanie Jagannathan

(57) ABSTRACT

A communication protocol for ultra-wideband communications is provided. The present invention provides compatibility and interoperability between ultra-wideband communications devices within various types of networks. In one embodiment, combined, or interleaved data frames having both high and low data transfer rate capability are provided. The low data transfer rate may be used for initial discovery of the type of network that is being accessed, and the high data transfer rate may be used to quickly transfer data within networks that have a high data transfer rate capability. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

13 Claims, 3 Drawing Sheets

U.S. PATENT DOCUMENTS

| | | | |
|---|---|---|---|
| 6,275,544 | B1 | 8/2001 | Aiello et al. |
| 6,281,784 | B1 | 8/2001 | Redgate et al. |
| 6,505,032 | B1 | 1/2003 | McCorkle et al. |
| 6,526,264 | B2 * | 2/2003 | Sugar et al. ............... 455/84 |
| 6,539,213 | B1 | 3/2003 | Richards et al. |
| 6,754,195 | B2 * | 6/2004 | Webster et al. ............ 370/335 |
| 6,760,300 | B1 * | 7/2004 | Eberle et al. ............... 370/210 |
| 6,853,835 | B2 * | 2/2005 | Wynbeek ..................... 455/78 |
| 6,873,611 | B2 * | 3/2005 | Rios ........................... 370/338 |
| 6,898,198 | B1 * | 5/2005 | Ryan et al. ................. 370/338 |
| 7,079,827 | B2 * | 7/2006 | Richards et al. ............ 455/266 |
| 2001/0033610 | A1 | 10/2001 | Chastain |
| 2002/0075972 | A1 | 6/2002 | Richards et al. |
| 2002/0076193 | A1 | 6/2002 | Melick et al. |

FOREIGN PATENT DOCUMENTS

| | | |
|---|---|---|
| WO | WO 01/93434 A2 | 12/2001 |
| WO | WO 02/31986 A2 | 4/2002 |

OTHER PUBLICATIONS

Henning F. Harmuth, "Applications of Walsh functions in communications", IEEE Spectrum, Nov. 1969, pp. 82-91, USA.

Robert Fleming, Cherie Kusher, "Integrated, Low-Power, Ultra-Wideband Transceivers for Distributed Position Location and Communication", Semi-Annual Technical Report Contract J-BFI-94-058, Aether Wire & Location, Inc. Jul. 1995, Nicaslo, CA, USA.

Robert Fleming, Cherie Kusher, "Low-Power, Miniature, Distributed Position Location and Communication Devices Using Ultra-Wideband, Nonsinusoidal Communication Technology", Semi-Annual Technical Report Contract J-BFI-94-058, Aether Wire & Location, Inc. Jul. 1995, Nicasio, CA, USA.

Fernando Ramirez-Mireles, Robert A. Scholtz, "N-Orthogonal Time-Shift-Modulated Codes for Impulse Radio", Report from Joint Services Electronics Program Contract F 49620-94-0022, CTMC 1997, IEEE Wireless 98; Jul. 1998, USA.

Fernando Ramirez-Mirales, "On Performance of Ultra Wideband Signals in Gaussian Noise and Dense Multipath", Paper 99C265, Accepted for Publication in the IEEE Transactions on Vehicular Technology, USC Ultralab, USA, 1998.

Robert A. Scholtz, P. Vijay Kumar, Carlos J. Corrada-Bravo, "Signal Design for Ultra-wideband Radio", Department of Electrical Engineering, University of Southern California, Los Angeles, CA, USA, 1998.

Moe Z. Win, Zoran A. Kostic, "Impact of Spreading Bandwidth on Rake Reception in Dense Multipath Channels", IEEE Journal on Selected Areas on Communications, vol. 17, No. 10, pp. 1794-1806, Oct. 1999, USA.

Moe Z. Win, George Chrisikos, Nelson R. Sollenberger, "Performance of Rake Reception in Dense multipath Channels: Implications of Spreading Bandwidth and Selection Diversity Order", IEEE Journal on Selected Areas on Communictions, vol. 18, No. 8, pp. 1516-1525, Aug. 2000, USA.

Henning F. Harmuth, "Frequency-Sharing and Spread-Spectrum Transmission with Large Relative Bandwidth", IEEE Transactions on Electromagnetic Compatability, vol. EMC-20, No. 1, Feb. 1978, USA.

Multispectral Solutions, Inc., "Revision of Part 15 of the Commission's Rules Regarding Ultra-Wideband Transmission Systems" Sep. 12, 2000.

Anna Scaglione, "Differential Direct Sequence Spread Spectrum for Ultra-Wideband Low power Wireless Microsystems", University of New Mexico, Dept. of EECE, Albuquerque, NM, USA, 2000.

* cited by examiner

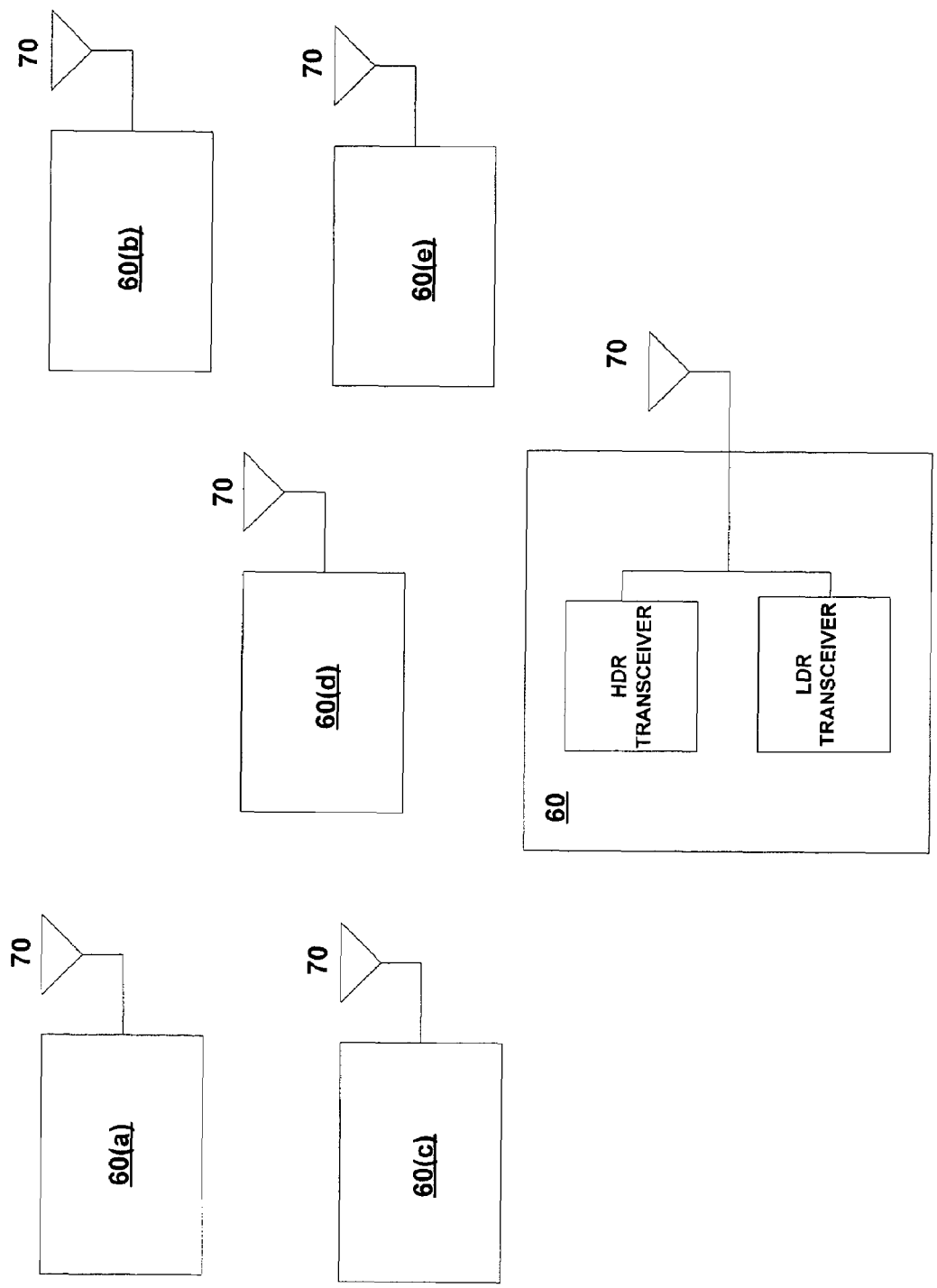

ULTRA-WIDEBAND COMMUNICATION PROTOCOL

FIELD OF THE INVENTION

The present invention relates to the field of wireless communications. More particularly the present invention describes a communication protocol for ultra-wideband communications.

BACKGROUND OF THE INVENTION

The Information Age is upon us. Access to vast quantities of information through a variety of different communication systems are changing the way people work, entertain themselves, and communicate with each other. Faster, more capable communication technologies are constantly being developed. For the manufacturers and designers of these new technologies, achieving "interoperability" is becoming an increasingly difficult challenge.

Interoperability is the ability for one device to communicate with another device, or to communicate with another network, through which other communication devices may be contacted. However, with the explosion of different communication protocols (i.e., the rules communications equipment use to transfer data), designing true interoperability is not a trivial pursuit.

For example, most wireless communication devices employ conventional "carrier wave," or radio frequency (RF) technology, while other devices use electro-optical technology. Generally, each one of these communication technologies employ their own communication protocol.

Another type of communication technology is ultra-wideband (UWB). UWB technology is fundamentally different from conventional forms of RF technology. UWB employs a "carrier free" architecture, which does not require the use of high frequency carrier generation hardware; carrier modulation hardware; frequency and phase discrimination hardware or other devices employed in conventional frequency domain communication systems.

Within UWB communications, several different types of networks, each with their own communication protocols are envisioned. For example, there are Local Area Networks (LANs), Personal Area Networks (PANs), Wireless Personal Area Networks (WPANs), sensor networks and others. Each network may have its own communication protocol.

Therefore, there exists a need for a communication protocol for ultra-wideband communication devices, which will allow for compatibility and coexistence between different networks, and different ultra-wideband devices.

SUMMARY OF THE INVENTION

The present invention provides a common communication protocol for ultra-wideband communications. The present invention provides compatibility and interoperability between ultra-wideband communications devices within various types of networks. In one embodiment, combined, or interleaved data frames having both high and low data transfer rate capability are provided. The low data transfer rate may be used for initial discovery of the type of network that is being accessed, and the high data transfer rate may be used to quickly transfer data within networks that have a high data transfer rate capability.

The present invention may be employed in any type of network, be it wireless, wire, or a mix of wire media and wireless components. That is, a network may use both wire media, such as coaxial cable, and wireless devices, such as satellites, cellular antennas or other types of wireless transceivers.

These and other features and advantages of the present invention will be appreciated from review of the following detailed description of the invention, along with the accompanying figures in which like reference numerals refer to like parts throughout.

BRIEF DESCRIPTION OF THE DRAWING

FIG. 4. illustrates a wireless network of transceivers constructed according to the present invention.

Figure 1:
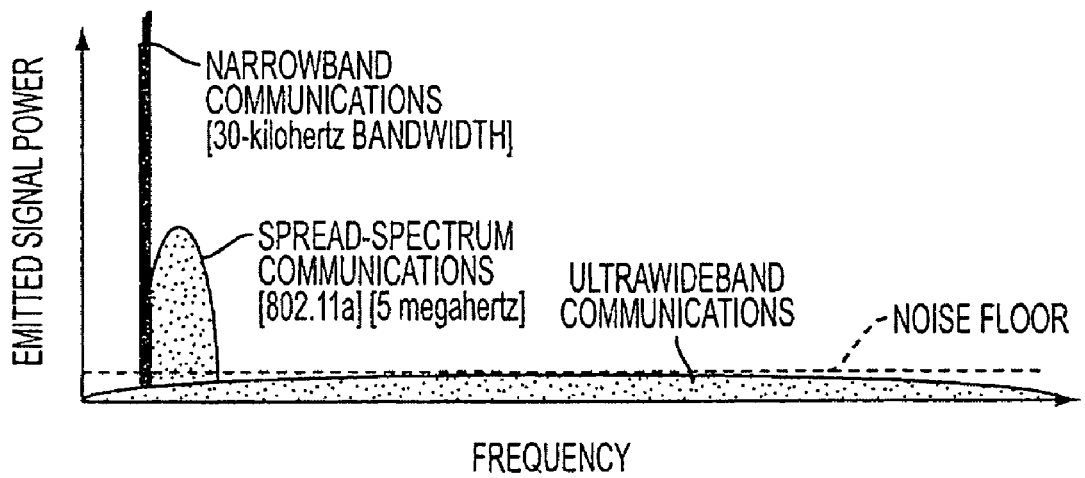
FIG. 1 is an illustration of different communication methods.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides compatibility and interoperability between ultra-wideband communication devices within various types of networks. In one embodiment, the present invention provides compatibility and interoperability between ultra-wideband communication devices that use different physical-layer interfaces. Thus, in wireless communications, the physical-layer interface comprises the processes and/or rules that wireless communication devices employ to communicate with each other. This interface, or protocol may be in the form of computer software, hardware or both software and hardware. "Interface" and "protocol" may be used interchangeably.

Compatibility between similar communication devices becomes important as the devices achieve penetration into the marketplace. For example, a variety of conventional wireless devices use the unlicensed 2.4 GHz frequency for communications. WiFi, Bluetooth and cordless phones, to name a few. However, because no common communication standard was established, many of these devices cannot communicate with each other, and moreover, many of these devices interfere with each other.

One feature of the present invention is that it enables communication between different types of interfaces employed by different devices.

A preferred embodiment of the present invention provides a protocol designed to facilitate coexistence between multiple devices utilizing different ultra-wideband physical-layer air interfaces.

The Institute of Electrical and Electronics Engineers (IEEE) is currently establishing rules and communication standards for a variety of different networks, and other communication environments that may employ ultra-wideband technology. These different communication standards may result in different rules, or physical-layer air interfaces for each standard. For example, IEEE 802.15.3(a) relates to a standard for ultra-wideband Wireless Personal Area Networks (WPANs). Ultra-wideband may also be employed in IEEE 802.15.4 (a standard for sensors and control devices), 802.11n (a standard for Local Area Networks), ground penetrating radar, through-wall imaging, and other networks and environments. Each one of these devices may employ ultra-wideband communication technology, and each device may also have its own communication standard.

As ultra-wideband technology achieves widespread penetration into the marketplace, compatibility between ultra-wideband enabled devices will become important. One feature of the present invention is that it insures reliable communications between ultra-wideband devices sharing dissimilar physical-layer air interfaces.

Another feature of the present invention is that it may be employed in any type of network, be it wireless, wired, or a mix of wire media and wireless components. That is, a network may use both wire media, such as coaxial cable, and wireless devices, such as satellites, or cellular antennas. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals or data. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others. The present invention may also be employed in any type of wireless network, such as a wireless PAN, LAN, MAN, WAN or WPAN.

The present invention is directed toward ultra-wideband technology, which in one embodiment is a "carrier free" architecture, which does not require the use of high frequency carrier generation hardware, carrier modulation hardware, stabilizers, frequency and phase discrimination hardware or other devices employed in conventional frequency domain communication systems. Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Referring to FIG. 1, another example of a conventional radio frequency technology is illustrated. 802.11a, a wireless local area network (LAN) protocol, transmits continuous sinusoidal radio frequency signals at a 5 GHz center frequency, with a radio frequency spread of about 5 MHz.

In contrast, ultra-wideband (UWB) communication technology employs discrete pulses of electromagnetic energy that are emitted at, for example, nanosecond or picosecond intervals (generally tens of picoseconds to a few nanoseconds in duration). For this reason, ultra-wideband is often called "impulse radio." That is, the UWB pulses are transmitted without modulation onto a sine wave carrier frequency, in contrast with conventional radio frequency technology as described above. A UWB pulse is a single electromagnetic burst of energy. A UWB pulse can be either a single positive burst of electromagnetic energy, or a single negative burst of electromagnetic energy, or a single burst of electromagnetic energy with a predefined phase. Alternate implementations of UWB can be achieved by mixing discrete pulses with a carrier wave that controls a center frequency of a resulting UWB signal. Ultra-wideband generally requires neither an assigned frequency nor a power amplifier.

Figure 2:
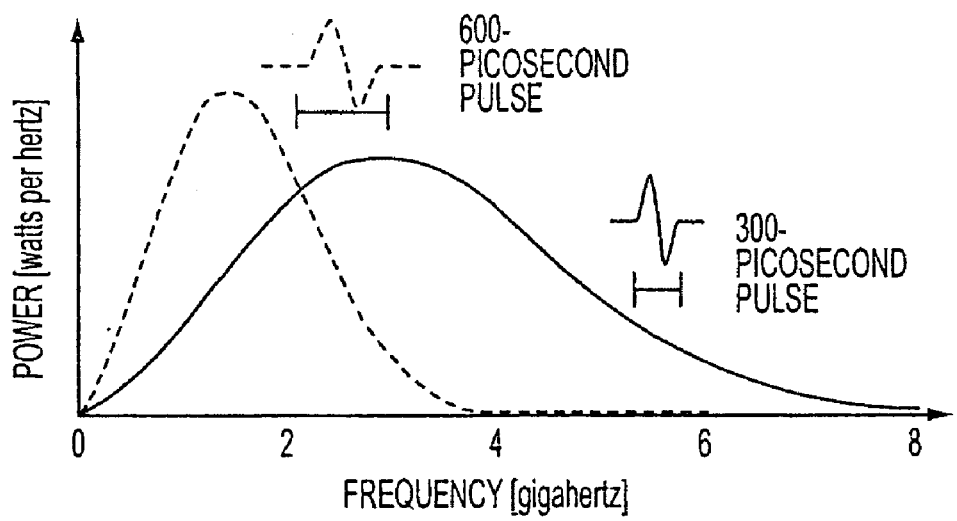
FIG. 2 is an illustration of two ultra-wideband pulses.

In contrast to the relatively narrow frequency spread of conventional communication technologies, a UWB pulse may have a 2.0 GHz center frequency, with a frequency spread of approximately 4 GHz, as shown in FIG. 2, which illustrates two typical UWB pulses. FIG. 2 illustrates that the narrower the UWB pulse in time, the broader the spread of its frequency spectrum. This is because bandwidth is inversely proportional to the time duration of the pulse. A 600-picosecond UWB pulse can have about a 1.6 GHz center frequency, with a frequency spread of approximately 1.6 GHz. And a 300-picosecond UWB pulse can have about a 3 GHz center frequency, with a frequency spread of approximately 3.2 GHz. Thus, UWB pulses generally do not operate within a specific frequency, as shown in FIG. 1. And because UWB pulses are spread across an extremely wide frequency range or bandwidth, UWB communication systems allow communications at very high data rates, such as 100 megabits per second or greater. A UWB pulse constructed according to the present invention may have a duration that may range between about 10 picoseconds to about 100 nanoseconds.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt pulse of one nano-second duration spreads the one-watt over the entire frequency occupied by the UWB pulse. At any single frequency, such as at the carrier frequency of a CATV provider, the UWB pulse power present is one nano-watt (for a frequency band of 1 GHz). This is calculated by dividing the power of the pulse (1 watt) by the frequency band (1 billion Hertz). This is well within the noise floor of any communications system and therefore does not interfere with the demodulation and recovery of the original signals. Generally, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wire media will not interfere with wireless radio frequency transmissions. Therefore, the power (sampled at a single frequency) of UWB pulses transmitted though wire media may range from about +30 dBm to about −140 dBm.

Figure 3:
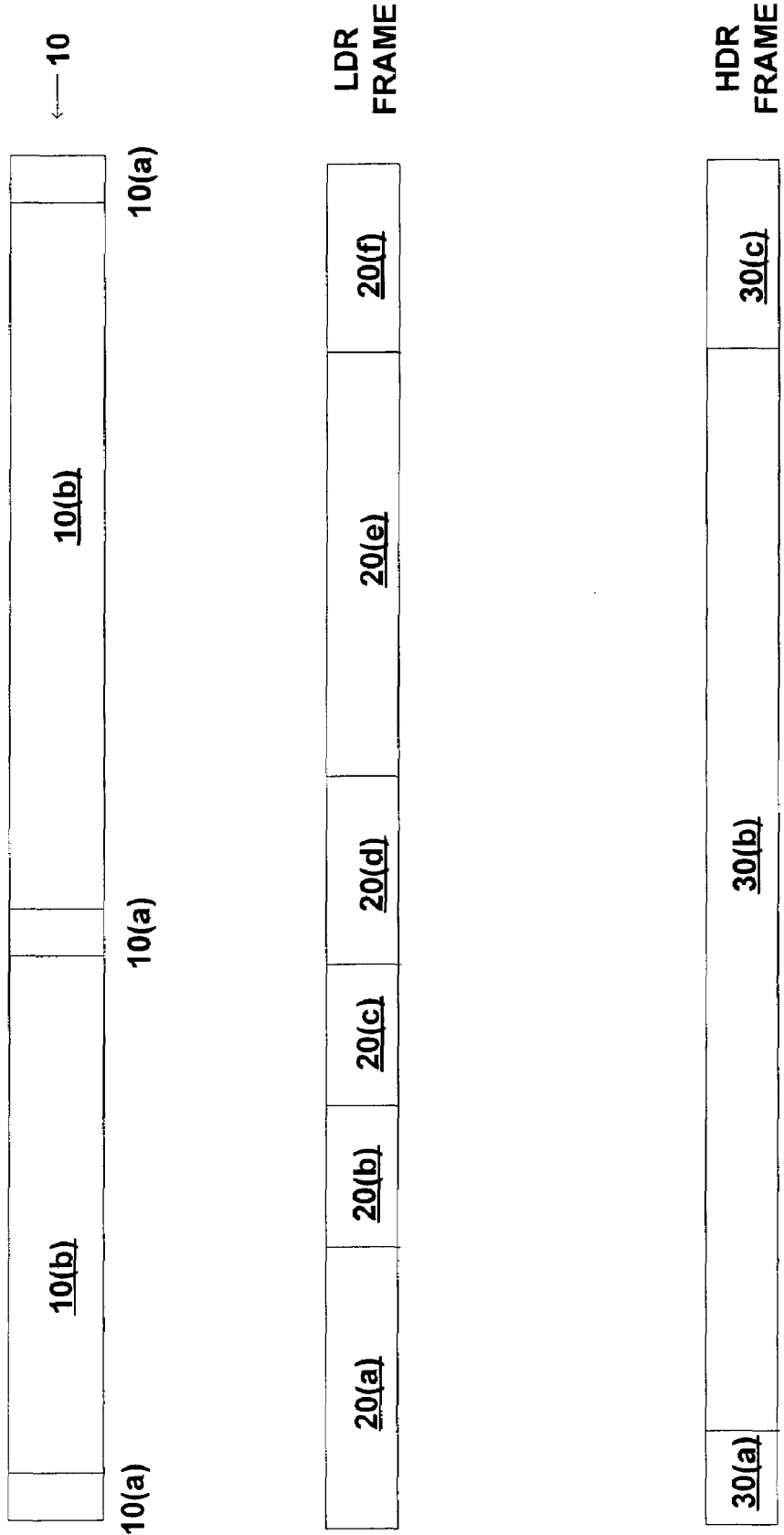
FIG. 3 illustrates embodiments of combination frames, high data rate frames, and low data rate frames, all constructed according to the present invention.

Referring now to FIG. 3, combination, or interleaved frames 10 constructed according to one embodiment of the present invention are illustrated. A "frame" as defined herein may include several different embodiments. Generally, a frame is data that is transmitted between communication points (i.e., mobile or fixed communication devices) as a unit complete with addressing and other protocol information. That is, a frame is configured by a set of rules and carries data between communication devices. In one embodiment, a frame includes data to be transmitted, error-correcting information for the data, an address, timing or synchronization information, and other features and functions depending on the protocol that the frame was formed under. A frame may include another frame within it, that may be configured, and/or used by a different protocol. A frame may also be configured similar to a Time Division Multiple Access (TDMA) frame.

As shown in FIG. 3, the combination frames 10 include both low data rate (LDR) frames 10(a) and high data rate (HDR) frames 10(b). Each LDR frame 10(a) may be configured to transmit data at a rate that may range between about 1 kilobit per second to about 5 megabits per second. Each HDR frame 10(b) may be configured to transmit data at a rate that may range between about 5 megabits per second to about 1 gigabit per second.

One feature of the present invention is that low data rate ultra-wideband (UWB) devices and high data rate UWB devices may communicate with each other through the use of combination frames 10. For example, one type of UWB device may use a protocol that is only capable of communication at relatively low data rates, while another UWB device may use a protocol that is capable of communication at relatively high data rates.

A UWB communication device employing the combination frames 10 protocol of the present invention would be able to communicate with both low and high data rate UWB devices. For example, a number of different applications of UWB technology have been proposed, with each having its own data rate capability. In a UWB PAN, the data rates may approach 480 Mbps and distances may be limited to 10 meters. In a LAN application the data rate may be variable dependent on the distance from the network access point. For example, if a UWB communication device is 10-meters from the access point, the data rate may be 500 Mbps. A user farther from the access point may have a 200 Mbps data rate. At a 100-meter distance from the access point the data rate may be only a few megabits per second. Another proposed application for UWB communications technology is a low data rate control and sensor data system. The low data rate application may be good for communicating geographic location information, and other low data rate information. A UWB device employing a communication protocol using combination frames 10 would be able to communicate with any or the above-described UWB networks and devices.

A UWB device constructed according to the present invention may employ both a low and a high data rate transceiver. A UWB device may be a phone, a personal digital assistant, a portable computer, a laptop computer, a desktop computer, a mainframe computer, video monitors, computer monitors, or any other device employing UWB technology.

Low data rate transceivers generally use small amounts of energy, with high data rate transceivers generally using significantly more energy. One advantage of the present invention is that a UWB communication device employing both a low and high data rate transceiver may use the low data rate (LDR) portion for discovery, control, network log on, and protocol negotiation while the high data rate (HDR) portion is powered down, thus conserving power and extending battery life. For example, the LDR transceiver may signal a local UWB device or network, and discover its communication capabilities. The LDR transceiver may then synchronize with the local UWB device/network and provide the synchronization information to the HDR transceiver, which until now, has been in sleep mode, thereby conserving energy. This type of communication sequence would employ a communication protocol that would use the combination frames 10 discussed herein.

As shown in FIG. 3, the combination, or interleaved sequence in combination frames 10 shows Low Data Rate (LDR) frames 10(a) interleaved with high data rate (HDR) frames 10(b). The frequency of occurrence of LDR frames 10(a) may vary with application and may be additionally dependent on the bandwidth demand of the device with which communication is desired. For example, the number of LDR frames 10(a) may increase when communicating with a low data rate device, and decrease when communicating with a high data rate device.

Both LDR frames 10(a) and HDR frames 10(b) are comprised of groups of symbol slots (not shown). The number of symbol slots in a frame may vary from about 100 to about 100,000. In one embodiment, each symbol slot is comprised of 25 time bins (not shown), with each time bin sized at about 400 picoseconds. Other time bin arrangements, with different time bin sizes, may also be constructed. Within one or more of these time bins, an ultra-wideband (UWB) pulse may be positioned, depending on the data modulation technique that is employed. That is, the position, amplitude, phase or other aspect of the UWB pulse(s) within one, or more of the time bins comprising a symbol slot represents one or more binary digits, or bits, that comprise the data that is being transmitted or received. A group of these symbol slots comprise a LDR frame 10(a) or HDR frame 10(b), thereby enabling the transmission and reception of data.

In one embodiment of the present invention, LDR frames 10(a) and/or HDR frames 10(b) may have a duration that may range between about one (1) microsecond to about one (1) millisecond.

For example, in one embodiment, the LDR frames 10(a) may be arranged as follows: As shown in FIG. 3, the LDR frame comprises many symbol slots (as discussed above) that may be allocated into groups that provide different communication functions. Positioned within each symbol slot are groups of time bins that have one or more UWB pulses located therein. The LDR frame may include an extended preamble and synchronization time 20(a). The preamble and synchronization time 20(a) may be extended to ensure sufficient time for a UWB transceiver to achieve a synchronization lock. The LDR frame may additionally include a control section 20(b) to pass control messages and responses to and from a UWB device. These control messages may include power on, power off, and frame number assignments for communications. Time period 20(c) may be utilized by the transceiver to send geographic location information to a remote UWB device. A contention-based bandwidth request 20(d) may be provided to allow UWB devices to request bandwidth from a network. That is, a number of contention-based methods such as ALOHA, slotted ALOHA, and sensing algorithms with and without collision detection may be used to request time in the network for data transmission. The data payload time period 20(e) of the LDR frame is used to pass low-data-rate data to and from a device/network. Data error detection and correction is provided in time period 20(f). It will be appreciated that the construction of LDR frame may be varied to suit different protocols, and communication needs.

Again referring to FIG. 3, the HDR frame may comprise a smaller preamble and synchronization time period 30(a), a significantly longer data payload time 30(b), and an error detection and correction period 30(c). Additionally, HRD frames may be transmitted at a different power level than LDR frames. The length, or time duration of LDR frames and HDR frames may vary with the environment in which the communication system is installed. In situations where there is more probability of losing synchronization in mid-frame, the length, or time duration of the frames may be reduced.

For example, to increase the quality and reliability of communication, each frame 10(a) or 10(b) may have an amount of "guard time," which comprises time bins that are intentionally left empty. These empty time bins help the UWB device to locate the portion of the frame that contains UWB pulses. Depending on the communication modulation technique employed and/or the communications environment, the amount of guard time may be adjusted to accommodate multipath interference. In one embodiment, the number of LDR frames 10(a) may be significantly lower than HRD frames 10(b) (in a high data rate network), and less guard time may be required in the LDR frames 10(a). It will be appreciated that frames and time bins may have other durations, and that frames may employ different numbers of time bins.

Referring now to FIG. 4, which illustrates one or more network(s) of UWB devices 60(a)-60(e). A UWB high-low data rate communication device 60 constructed according the present invention contains both a high data rate (HDR) transceiver and an low data rate (LDR) transceiver. All of the devices 60 and 60(a)-(e) include communication antennas 70. The high-low data rate communication device 60 includes communication protocol computer logic in either a hardware and/or software form that constructs combination frames 10 as discussed above. Thus, the high-low data rate communication device 60 may communicate with device 60(a) that is simply a UWB sensor (or ground penetrating radar, through-wall imager, precision locator, etc.), and can only communicate using low data rates. Or, high-low data rate communication device 60 may communicate with device 60(d), that is a mainframe computer which acts as a master transceiver that manages communications on a high data rate ultra-wideband network.

Thus, one feature of the present invention is that by providing a common signaling protocol that may communicate with all UWB communication devices, a UWB device employing one type of protocol with a low data rate may communicate with a network access point employing a different protocol using a high data rate.

Another feature of the present invention is that in an environment with multiple network access points, the high-low data rate communication device 60 may communicate with all available access points and log onto the most suitable network. For example, a high data rate mobile device whose transmitted signal occupies the entire available bandwidth may communicate when presented with a low data rate network access point.

Or, the high-low data rate communication device 60 may substantially simultaneously contact: a network access point that employs Orthogonal Frequency Division Multiplexing (OFDM); an access point whose high data rate signal occupies the entire available bandwidth; and a low data rate sensor, and the device 60 may contact each one across a low data rate channel using the common signaling protocol of the present invention. The device 60 and the access points may then do discovery across the low data rate channel. The low data rate access point and the OFDM style high data rate access point may offer connection across only the low data rate channel, to accommodate the low data rate sensor. The high data rate access point may offer either a high or a low data rate channel to the high-low data rate communication device 60. In this example, the high-low data rate communication device 60 may select to log onto the high data rate network.

Another feature of the present invention is that the LDR transceiver may send a power-on or wake-up signal to the HDR transceiver, both located within the high-low data rate communication device 60. In this embodiment, the LDR transceiver may additionally provide a coarse timing reference to the HDR transceiver, thus assisting with time synchronization.

Within a network, an initialization protocol for a fixed access point in the network may involve a listening time period prior to beacon initialization. In one feature of the present invention, if a beacon from a first access point is detected, a second access point may synchronize to the beacon signal emitted by the first access point. It is possible that these access points may be connected by a wire medium, such as fiber-optic cable, coaxial cable, twisted-pair wire, or other wire media. In this type of environment, the synchronization and initialization of an additional access point may be accomplished via the wire medium.

Again referring to FIG. 4, in another embodiment of the present invention, a fixed network access point, or master transceiver, such as 60(d) may periodically transmit a beacon signal at a low data rate. This beacon signal may include the geographic location of the master transceiver 60(d). A mobile high-low data rate communication device 60 that moves within the coverage area of the master transceiver 60(d) receives the beacon signal with the LDR transceiver and may use the geographic location information to assist in calculating its geographic location. Since the beacon signal may be primarily used for discovery, and logon, the signal modulation technique used for the beacon signal may alternate between techniques used by various transceivers. For example, the beacon signal may alternate between an on-off keying (OOK) signal that occupies a significant portion of the available bandwidth and an OFDM style signal. In this manner a transceiver expecting an OFDM style signal will be able to receive the low data rate frames and complete discovery using those beacon signals, while another type of transceiver may use the OOK beacon signal. Alternatively, a modulation method called binary phase shift keying (BPSK) may be employed by the present invention.

As mentioned above, there are several different types of signal modulation techniques and methods. Ultra-wideband pulse modulation techniques enable a single representative data symbol to represent a plurality of binary digits, or bits. This has the obvious advantage of increasing the data rate in a communications system. A few examples of modulation include: Pulse Width Modulation (PWM); Pulse Amplitude Modulation (PAM); and Pulse Position Modulation (PPM). In PWM, a series of predefined UWB pulse-widths are used to represent different sets of bits. For example, in a system employing 8 different UWB pulse widths, each symbol could represent one of 8 combinations. This symbol would carry 3 bits of information. In PAM, predefined UWB pulse amplitudes are used to represent different sets of bits. A system employing PAM16 would have 16 predefined UWB pulse amplitudes. This system would be able to carry 4 bits of information per symbol. In a PPM system, predefined positions within an UWB pulse timeslot are used to carry a set of bits. A system employing PPM16 would be capable of carrying 4 bits of information per symbol. All of the above-described signal modulation methods, as well as others (such as ternary modulation, 1-pulse modulation and others) may be employed by the present invention.

Another feature of the present invention is that the LDR frames (shown in FIG. 3) may provide a variety of functionalities, such as remote shut-down or wake-up of a selected UWB device, and wireless update of firmware of the selected UWB device. Updating the firmware of the UWB device allows for the device to avoid early obsolescence in a rapidly changing technology environment.

Thus, it is seen a communication protocol for ultra-wideband communications is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. An ultra-wideband communication device, comprising:
a first transceiver that communicates information between any of a plurality of ultra-wideband communication devices employing a common physical layer at a first data rate; and
a second transceiver that communicates information between only those ultra-wideband communication devices having like physical layers, at a second data rate that is greater than or equal to the first data rate, wherein communication at the second data rate is established between those of the plurality of ultra-wideband communication devices having like physical layers, based on communication capabilities recovered as part of the information communicated at the first data rate while employing the common physical layer.

2. The ultra-wideband communication device of claim 1, wherein the first data rate transmits data at a rate that ranges between about 1 kilobit per second to about 5 megabits per second.

3. The ultra-wideband communication device of claim 1, wherein the second data rate transmits data at a rate that ranges between about 5 megabits per second to about 1 gigabit per second.

4. The ultra-wideband communication device of claim 1, wherein:
the first transceiver communicates at the first data rate; and
the second transceiver is kept off.

5. The ultra-wideband communication device of claim 1, wherein:
the first transceiver communicates at the first data rate; and
the second transceiver kept off until communication at the second data rate is desired.

6. A communication network, comprising:
at least two communication devices each having a first transceiver and a second transceiver, wherein each first transceiver implements a common physical layer operating at a low data rate for communicating information, and each of the at least two communication devices operate to select at least one physical layer associated with the second transceiver of each of the at least two implementing at least two communication devices, for communication at a high data rate, based on communication capabilities recovered as part of the information communicated at the low data rate using the common physical layer; and
a master transceiver capable of communicating with the at least two communication devices via the first transceiver using the common physical layer operating at the low data rate, the master transceiver operating to allocate at least one of a low data rate communication frame and a high data rate communication frame to each of the at least two communication devices such that the at least two communication devices can exchange information using the at least low data rate communication frame and the at least one high data rate communication frame at corresponding low and high data rates.

7. The communication network of claim 6, wherein the low and high data rates are selected from a group consisting of: one kilobit per second, five megabits per second, 25 megabits per second, 50 megabits per second, 100 megabits per second, 200 megabits per second, 400 megabits per second, 480 megabits per second, 500 megabits per second, and one gigabit per second.

8. The communication network of claim 6, wherein the master ultra-wideband transceiver chooses each of the low and high data rates by determining a communication data rate capability of each of the at least two ultra-wideband communication devices.

9. The communication network of claim 6, wherein each of the at least two ultra-wideband communication devices transmit a plurality of pulses.

10. The communication network of claim 9, wherein each of the plurality of pulses has duration that ranges from about ten picoseconds to about one millisecond.

11. The communication network of claim 6, wherein each of the at least two ultra-wideband communication devices transmits a plurality of orthogonal frequency division multiplexing signals.

12. The communication network of claim 6, wherein each of the at least two ultra-wideband communication devices includes a low data rate transceiver and a high data rate transceiver.

13. The communication network of claim 6, wherein the master transceiver directs information through the network comprising the at least two communication devices by communicating configuration information to the at least two communication devices via the first transceiver using the common physical layer operating at the low data rate, said configuration information being used by the at least two communication devices to select modes comprising a low data rate, a high data rate, the common physical layer, and an alternative physical layer.

* * * * *